E. K. BAKER.
VEHICLE WHEEL.
APPLICATION FILED APR. 30, 1912.

1,155,397.

Patented Oct. 5, 1915.
3 SHEETS—SHEET 1.

E. K. BAKER.
VEHICLE WHEEL.
APPLICATION FILED APR. 30, 1912.
1,155,397.
Patented Oct. 5, 1915.
3 SHEETS—SHEET 2.
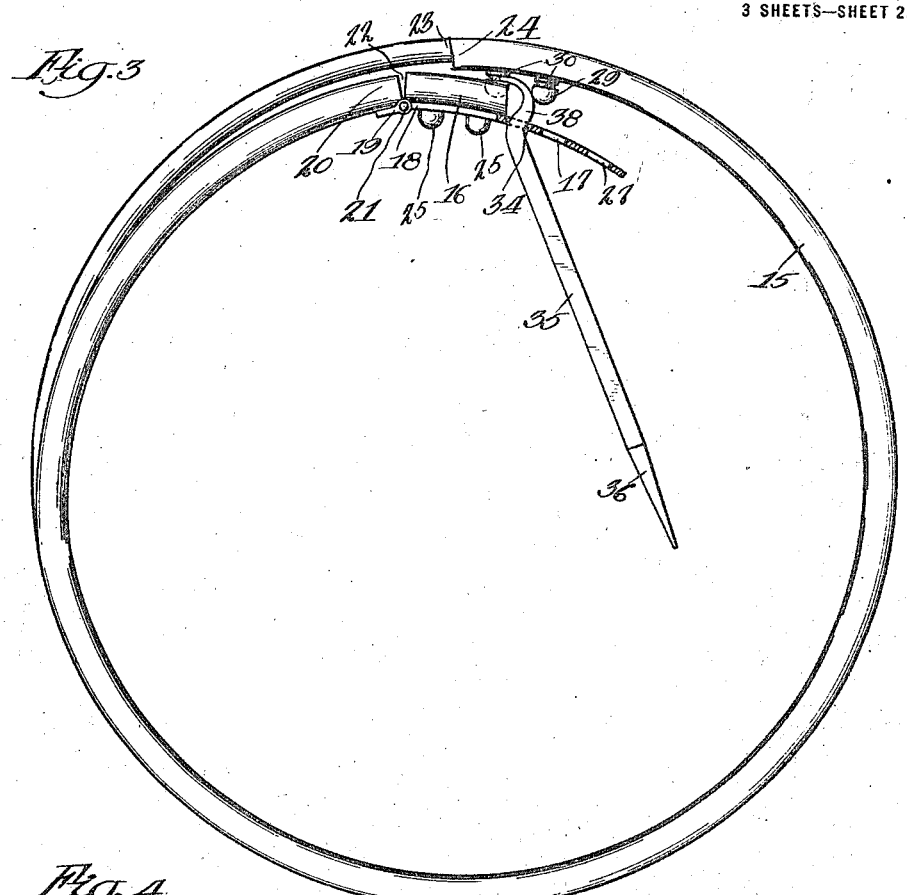
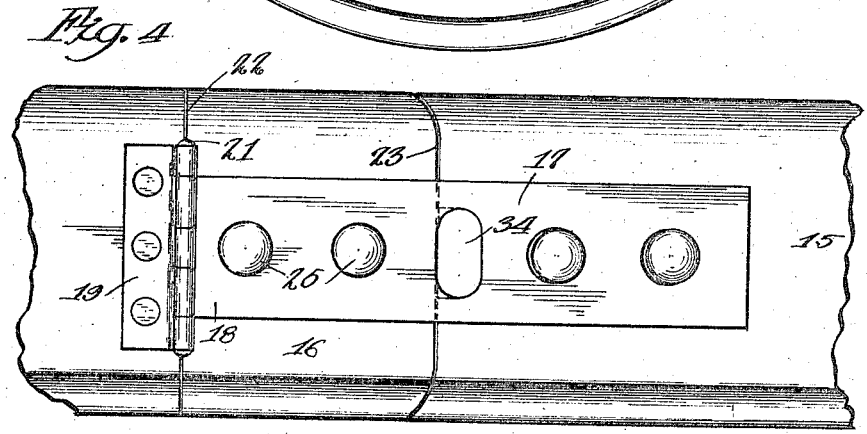
Witnesses:
Inventor:
Eric K. Baker
by [signature]
Atty.

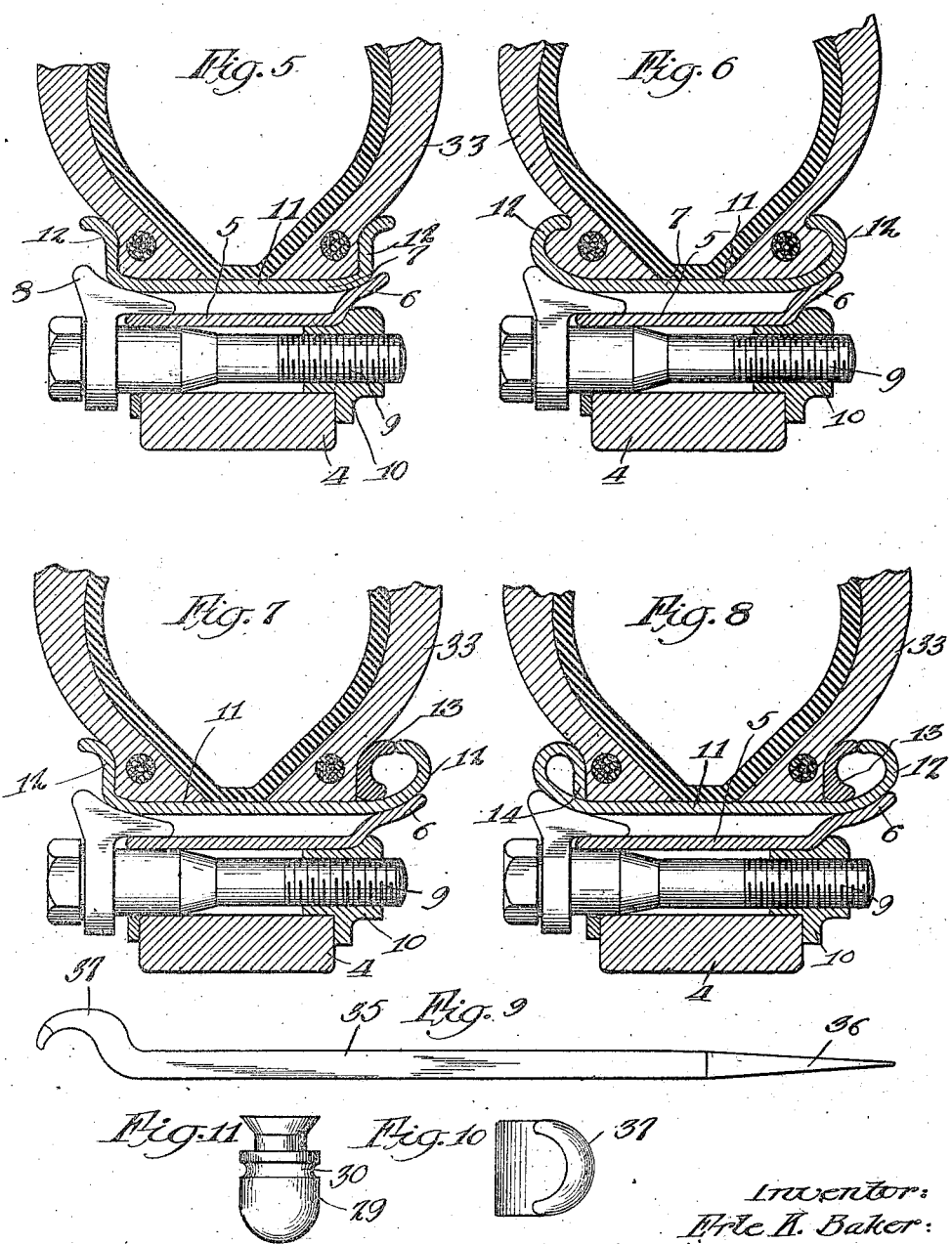

UNITED STATES PATENT OFFICE.

ERLE K. BAKER, OF CHICAGO, ILLINOIS, ASSIGNOR TO UNIVERSAL RIM COMPANY, OF CHICAGO, ILLINOIS, A CORPORATION OF ILLINOIS.

VEHICLE-WHEEL.

1,155,397.  Specification of Letters Patent.  Patented Oct. 5, 1915.

Application filed April 30, 1912. Serial No. 694,246.

*To all whom it may concern:*

Be it known that I, ERLE K. BAKER, a citizen of the United States, and a resident of Chicago, Cook county, Illinois, have invented certain new and useful Improvements in Vehicle-Wheels, of which the following is a specification.

My invention relates to improvements in vehicle wheels and has particular reference to improvements in demountable rims for resilient tires.

The object of my invention is to provide a demountable rim of simple construction which shall be capable of being easily and quickly placed upon and taken from a resilient tire, which has a base that is substantially inexpansible.

My invention resides in a tire rim provided with a relatively short removable section which is permanently attached or hinged to one end of the rim and is adapted to be removably or detachably connected with the opposite end of the rim.

My invention further includes the idea of providing a relatively large opening or hole in this removable part through which the valve stem of the tire may be projected and which may be made use of in combination with a suitably shaped tool to effect the contraction of the rim.

My invention also includes the idea of making an easily collapsible rim which is provided with integrally flanged edges and which is adapted to carry or retain either of two types of tires.

My invention also consists in the various features of construction and the several combinations of parts whereby and wherein the above and other ideas are embodied and all as hereinafter described and particularly pointed out in the appended claims.

Figure 1:
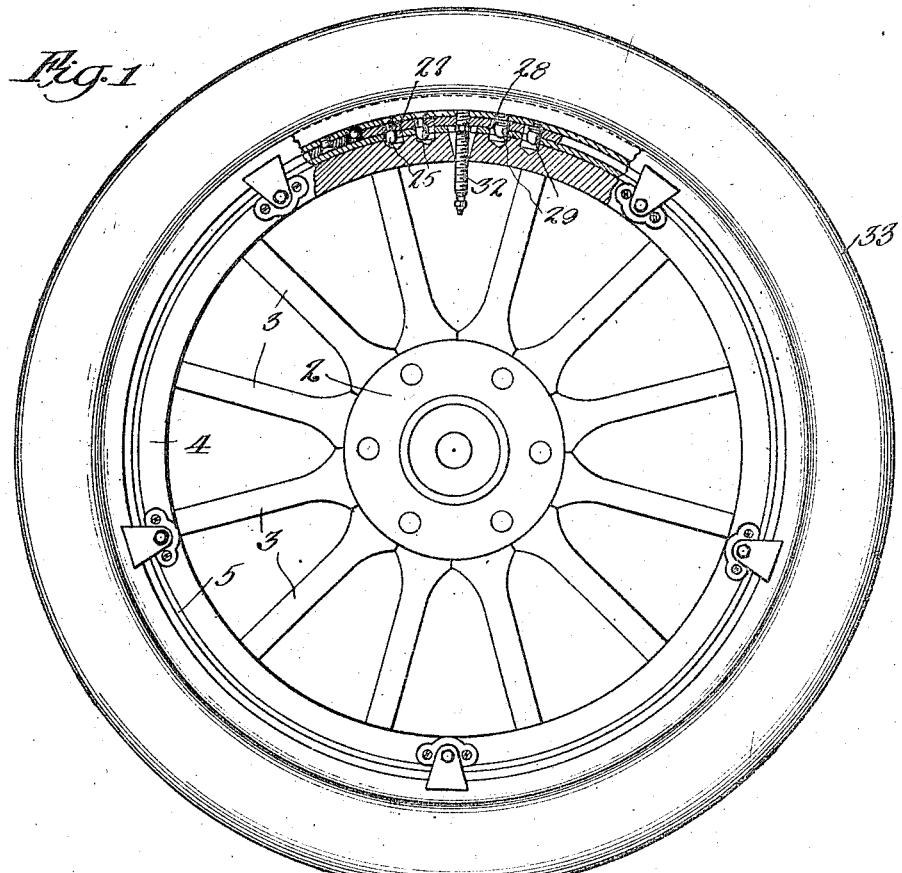
Figure 2:
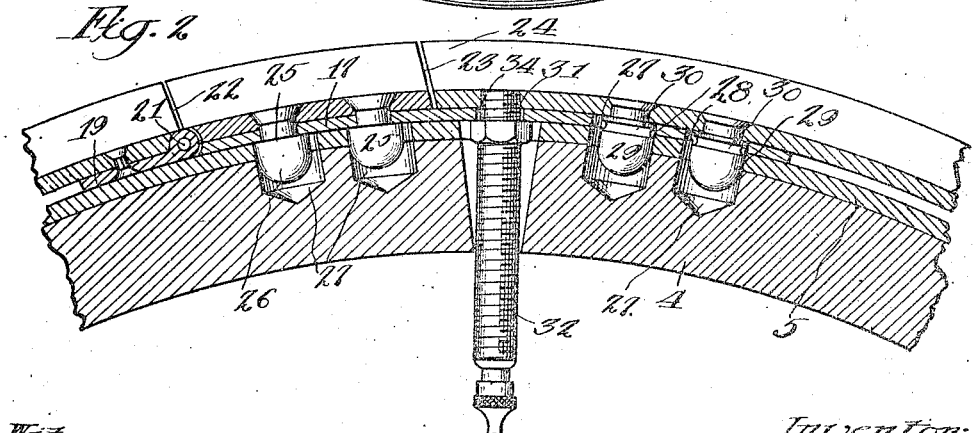

My invention will be more readily understood by reference to the accompanying drawings forming part of this specification and in which:

Figure 1 is a side elevation, partly in section, of a vehicle wheel equipped with a pneumatic tire and made in accordance with my invention; Fig. 2 is an enlarged sectional view similar to the sectional part shown in Fig. 1, the tire being removed; Fig. 3 is a side elevation of the rim shown in its contracted condition; Fig. 4 is an enlarged inner view of the rim showing the removable section; Figs. 5, 6, 7 and 8 are transverse sections of the rim of the wheel showing the wheel equipped with different forms of rims adapted to receive and hold various types of tires; Fig. 9 is a side elevation of the contracting tool; Fig. 10 is an end view of the contracting tool; and Fig. 11 is an enlarged view of one of the dowel pins.

The wheel which I have illustrated is formed in the usual manner, and consists of a hub 2, spokes 3 and felly 4. The felly is equipped with a continuous metal ring or felly band 5 which is permanently mounted thereon. This felly band is substantially cylindrical in form and is provided at its rear edge with a continuous circumferential flange 6 which projects outwardly at an angle and is adapted to support one side or edge of the tire rim 7. The opposite edge of the tire rim is adapted to be supported upon wedging lugs 8 which are carried upon transversely mounted screw bolts 9, and the felly is provided with fixed nuts 10, the coöperation of the bolts and nuts being adapted to draw the wedges between the tire rim 7 and the felly band 5 and removably but rigidly secure the tire rim upon the wheel.

The tire rim is substantially channel-shaped in cross section, that is, it has a substantially cylindrical middle or base portion, 11, which is bordered by integral outwardly extending flanges 12 at each edge. These flanges may take several forms, that is, they may be formed to adapt the rim to receive and hold different types of rims. For instance, in Fig. 5 I have shown the rim adapted to receive what is known as a straight side or Dunlop form of tire, the flanges in this case extending radially outward substantially at right angles to the base portion of the rim. In Fig. 6 I have shown the flanges 12 as being curved or turned inwardly, forming hooked flanges, adapted to receive the hooking beads of a clencher tire. In Fig. 7 I have illustrated what might be termed a "combination rim" in that one flange is formed substantially straight and the opposite flange is made in inwardly turned or hooked form, and the rim is provided with a loose ring 13 which is adapted to be positioned adjacent to or in contact with either of the flanges to adapt the rim to receive and retain either a Dunlop or a clencher tire.

In Fig. 8 I have shown a still further modification of the flanges. In this case both flanges are inwardly turned, one thereof being rolled over to such an extent that its extreme edge 14 is brought down into contact with the main or central portion of the rim and thereby the edge of the rim is formed at this side to receive a Dunlop tire. The opposite flange is turned inwardly to form a hooked flange to receive a clencher tire and the tire is provided with a loose ring, similar to the ring 13, which is formed radially on one surface to coact with the Dunlop flange and hooked on its opposite surface to coact with the clencher flange to adapt the rim for receiving either a Dunlop tire or a clencher tire. In all cases the rim is formed of a main circumferential part or section 15 and a relatively small part or section 16. In the production of these rims I usually roll them in the form of an endless ring and then cut the rim at two transverse points to form the two parts or sections of the rim. The small or removable section of the rim 16 is mounted upon or riveted to a bridge plate 17 which is conformed to and contacts with the inner surface of the rim and lies in the space between the rim and the felly band. One end 18 of this bridge plate coincides with one end of the small section 16 and the plate is formed at this end to be pivotally mounted upon a hinge member 19 secured to the adjacent end 20 of the main part of the rim. The pivot 21 of the hinge is located immediately within the adjacent joint 22 formed between the removable section and the end 20 of the rim, and the removable section is adapted to be rotated on the hinge joint and thus be withdrawn inwardly from its normal position. The joint 23 between the opposite end of the section and the opposite end 24 of the main part of the rim is cut on such an angle that the small section can be removed by rotation on its pivot without binding or causing the rim to expand in the operation. The bridge plate 17 is riveted to the removable section by rivets 25 which have large heads 26 on their inner ends, said heads being adapted to project into sockets 27 provided in the felly of the wheel and thereby retain the rim and wheel against relative movement. The bridge plate, as explained before, extends beyond the removable section and projects beneath the opposite end 24 of the main part of the rim, and is provided with holes 28 adapted to receive dowel pins 29 which project inwardly from the inner surface of the main part of the rim. These dowels 29 are similar to the heads 26 of the rivets 25 and are adapted to enter sockets formed in the rim similar to the sockets 27. Each of these dowels 29 is provided with an annular groove 30 adjacent to its base, the purpose of which will be described hereinafter. The end 24 of the main part of the rim is provided with a notch or opening 31 adapted to receive the valve stem 32 of the tire 33 and the bridge plate 17 is provided with a suitable valve stem opening 34. For the purpose of contracting the rim sufficiently either to place the extra flange 13 thereon, or for the purpose of placing the rim upon a tire or removing it therefrom, I provide a tool 35 which is formed at one end 36 to be useful as a tire tool and at the other end is formed into a hook 37 which is adapted to project into one of the grooves 30 when the tool is placed against the dowel pin. This tool is used in the manner clearly illustrated in Fig. 3 to contract the ring. The bridge plate is first pried off of the dowel pins 29, this operation withdrawing the stem of the valve from the valve stem hole 34 of the bridge plate and then the hooked end of the tool is passed through the valve stem hole and placed against one of the dowel pins, the hooked end of the tool entering the groove 30 of the pin and forming a reliable fulcrum. The other end of the tool is then forced transversely in a direction to contract the rim, as shown in Fig. 3.

The rim as herein described is one which can be manufactured at a relatively low cost, it can be easily manipulated to place it upon or remove it from a resilient tire which has a substantially inexpansible base and in itself separate from the wheel upon which it is intended to be used, it forms a complete tire carrier adapted to carry a pneumatic tire in inflated condition ready for immediate application to a wheel.

As many further modifications of my invention will readily suggest themselves to one skilled in the art, I do not limit or confine myself to the specific structures herein shown and described.

Having thus described my invention, I claim as new and desire to secure by Letters Patent:

1. A tire rim having an integral tire-retaining flange at each edge and having a main part and a removable section, the removable section being hinged at one end to the adjacent end of the main part, a circumferential projection extending from the opposite end of the removable section adapted to contact with the inner surface of the main part, a radially projecting dowel on the main part and said projection having an opening to receive the dowel to separably connect the removable section with the main part.

2. A pneumatic tire rim having integrally formed tire-retaining flanges at each edge and divided circumferentially into a main part and a removable section, the removable section being hinged at one end to the adjacent end of the main part, a bridge plate carrying the removable section and extending beneath the opposite end of the main part, a dowel pin on the opposite end of the main part, and said bridge plate having an opening adapted to receive said dowel pin, the rim and the bridge plate being provided with openings adapted to receive the valve stem, said dowel being formed to receive and retain the end of an operating lever adapted to be projected through the valve-stem hole of the bridge plate for the purpose of contracting the rim.

3. A tire rim adapted to hold a pneumatic tire and comprising a main section having a gap and a relatively short section adapted to fill the gap, a bridge plate upon which said short section is permanently mounted, said bridge plate being hinged at one end to one end of the main part of the rim and adapted to project beneath the opposite end and to be separably connected therewith whereby the rim is held against contraction and expansion.

4. A pneumatic tire carrier adapted to receive and retain either one of two types of tires and comprising a main circumferential section having a gap and a relatively short circumferential section adapted to fill the gap, said short section being hinged at one end to the adjacent end of the main section and adapted to be removably connected at its opposite end to the opposite end of the main section, said rim as a whole having an integrally formed tire flange of one type at one side and an integral tire flange of a second type at the other side and a loose flange ring mounted on the rim between the integral flanges and movable from side to side and adapted to coöperate with either of the rim flanges to hold a tire.

5. A pneumatic tire rim adapted to carry either a Dunlop or a clencher tire and comprising a main circumferential section presenting a gap and a short section adapted to fill the gap, said short section being hinged at one end to the adjacent end of the main section and formed at its opposite end to be removably connected with the opposite end of the main section, said rim as a whole having an integral inwardly turned clencher flange at one side and an integral inwardly turned straight or radial flange at the opposite side, and a loose flange ring carried by the rim between the flanges adapted to be moved from one side to the other and to present on each side a tire-receiving flange similar to the oppositely disposed integral flange.

6. A pneumatic tire holder adapted to alternately receive a clencher tire and a tire having a straight-sided base and comprising a metallic rim provided with an inwardly curved, hooked clencher flange at one side, an integral tire-retaining flange at the other side which is rolled over with its extreme edge in contact with the main body of the rim and which presents a substantially radial flange surface, and a loose flange ring on the rim between the integral flanges movable from side to side thereon and presenting a hooked clencher flange opposed to the integral hooked flange, and a straight or radial surface opposed to the integral radial flange.

7. A sheet metal pneumatic tire-carrier adapted to alternately receive a clencher tire and a tire having a base with substantially straight or radial sides and comprising an integrally-flanged tire rim in the form of a split or open ring, one of said flanges being inwardly curved to receive a clencher bead, the other of said flanges being curved inwardly and rolled over with the extreme edge turned radially inwardly to present a radial tire-contacting surface, and a removable flange on the rim adjustable against either of the integral flanges and formed to present a hooked clencher flange opposed to the integral clencher flange, and a radial flange opposed to the integral radial flange.

In testimony whereof, I have hereunto set my hand, this 27th day of April, 1912, in the presence of two subscribing witnesses.

ERLE K. BAKER.

Witnesses:
 EDWARD F. WILSON,
 JOHN R. LEFEVRE.